United States Patent [19]

Brakebill

[11] 4,181,106
[45] Jan. 1, 1980

[54] ENGINE CONTROL SYSTEM AND A DIFFERENTIAL VACUUM REGULATOR THEREFOR OR THE LIKE

[75] Inventor: Harold G. Brakebill, Knoxville, Tenn.

[73] Assignee: Robertshaw Controls Company, Richmond, Va.

[21] Appl. No.: 914,201

[22] Filed: Jun. 12, 1978

Related U.S. Application Data

[62] Division of Ser. No. 672,593, Apr. 1, 1976, Pat. No. 4,108,372.

[51] Int. Cl.[2] .......................... F02P 5/04; G05D 23/00
[52] U.S. Cl. .............................. 123/117 A; 123/117 R; 236/87
[58] Field of Search .................. 123/117 A, 117 R; 236/86, 87, 101 R, 101 A, 101 C; 137/468, 595, 625.18, 625.5, 513.3

[56] References Cited

U.S. PATENT DOCUMENTS

| 3,333,770 | 8/1967 | Freiberger | 236/87 |
| 3,383,041 | 5/1968 | Stratynski | 236/87 |
| 3,521,610 | 7/1970 | Coudriet | 123/117 A |
| 3,612,018 | 10/1971 | Soberski | 123/117 A |
| 3,995,607 | 12/1976 | Ludwig et al. | 123/117 A |
| 4,024,845 | 5/1977 | Nomura | 123/117 A |

Primary Examiner—Charles J. Myhre
Assistant Examiner—P. S. Lall
Attorney, Agent, or Firm—Candor, Candor & Tassone

[57] ABSTRACT

A differential vacuum regulator having a housing provided with an inlet for being interconnected to a vacuum source and an outlet for being interconnected to a vacuum operated device, valve means being carried by the housing for interconnecting the inlet and the outlet together to provide a certain vacuum level at the outlet when the regulator senses a temperature below a certain temperature and for interconnecting the inlet and the outlet together to produce a different vacuum level at the outlet when the regulator is sensing the certain temperature.

5 Claims, 6 Drawing Figures

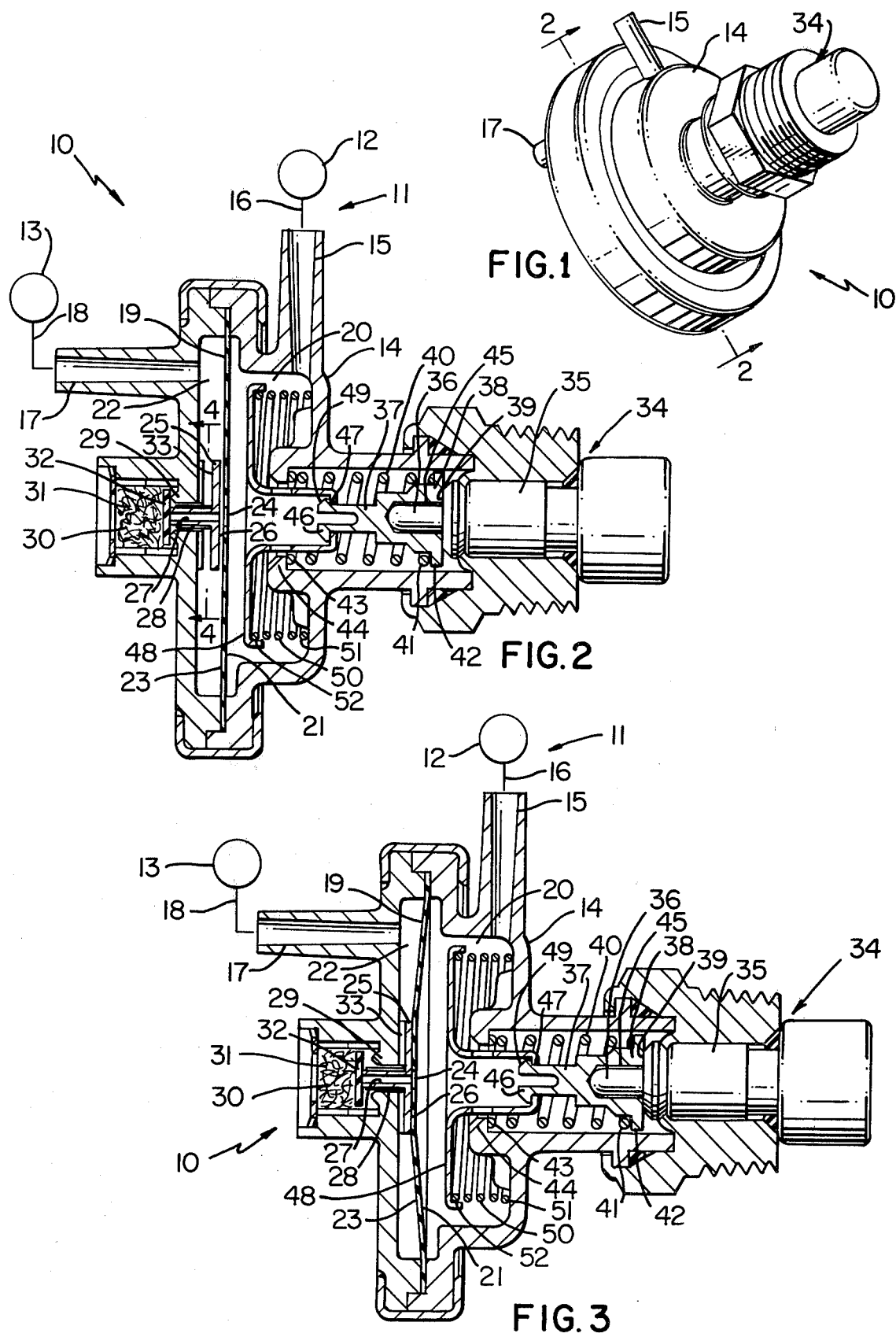

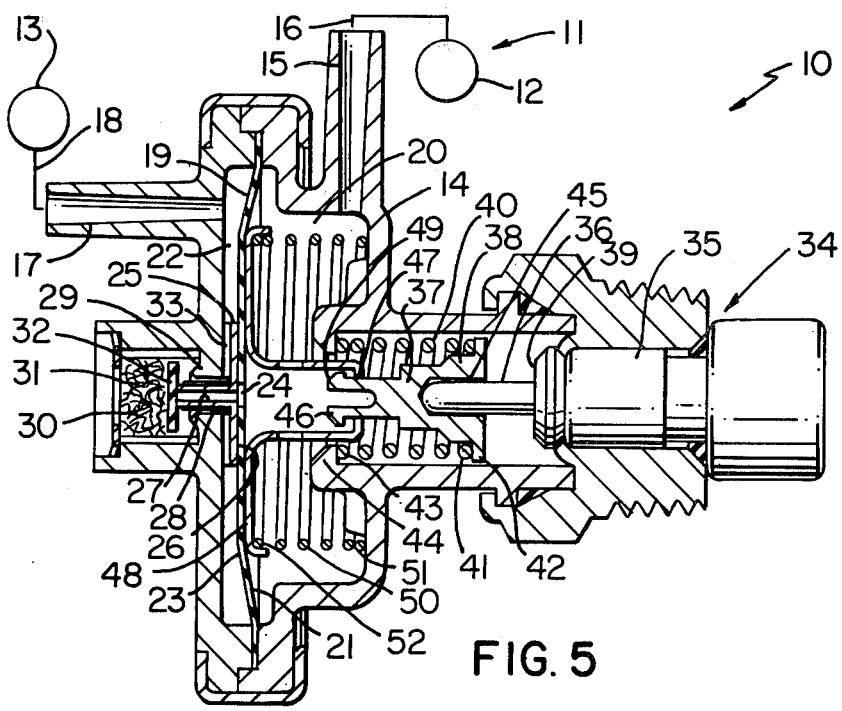
FIG. 5
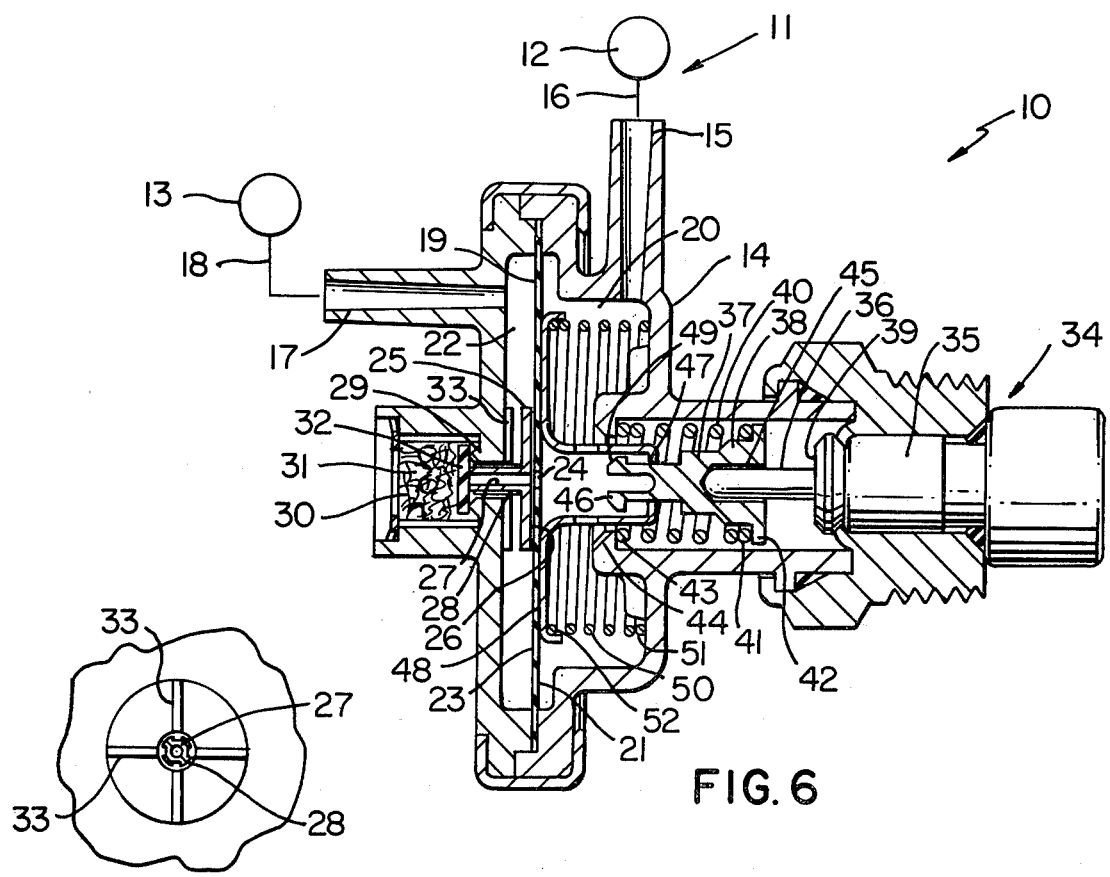
FIG. 4
FIG. 6

ENGINE CONTROL SYSTEM AND A DIFFERENTIAL VACUUM REGULATOR THEREFOR OR THE LIKE

This application is a divisional application of copending parent application Ser. No. 672,593, filed Apr. 1, 1976, now U.S. Pat. No. 4,108,372.

This invention relates to an improved vehicle engine control system and to a differential vacuum regulator for such a system or the like.

It is well known that in a pneumatic spark timing system for an automobile engine or the like, it is desired that at a predetermined temperature of the engine, the vacuum being transmitted to the distributor vacuum actuator should be reduced below the manifold vacuum a certain amount as a step function so that there will be a shift in the spark timing to prevent overheating of the engine.

In the past, such spark timing adjustment was accomplished by utilizing a vacuum reducing valve and a thermal selector valve, the vacuum reducing valve receiving manifold vacuum as an input and delivering an output of the manifold vacuum minus 1.5 inches Hg. This reduced vacuum output and the unreduced manifold vacuum where both piped to a three-way thermal selector valve which selected one of the two, typically the unreduced manifold vacuum, at engine coolant temperatures below 220° F. and the other of the two, the manifold vacuum minus 1.5 inches Hg, at engine coolant temperatures above 220° F., and directed the selected vacuum source to the distributor. This resulted in a shift in the spark timing at 220° F. to prevent engine overheating.

It is a feature of this invention to combine the functions of both of the above devices into one self-contained unit.

In particular, one embodiment of this invention provides a differential vacuum regulator having a housing means provided with an inlet adapted to be interconnected to the vacuum manifold of a vehicle engine and an outlet adapted to be interconnected to the vacuum operated spark timing distributor means of the vehicle. The housing means carries a valve means for interconnecting the inlet and the outlet together to produce a certain vacuum level at the outlet when the regulator is sensing an engine coolant temperature below a certain temperature whereby the distributor means is operated at one level of operation thereof and for interconnecting the inlet and the outlet together to produce a different vacuum level at the outlet when the regulator is sensing the certain temperature whereby the distributor means is operated at another level of operation thereof.

Accordingly, it is an object of this invention to provide an improved vehicle engine system having one or more of the novel features set forth above or hereinafter shown or described.

Another object of this invention is to provide a differential vacuum regulator having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a perspective view of the improved differential vacuum regulator of this invention;

FIG. 2 is an enlarged cross-sectional view taken one line 2—2 of FIG. 1, FIG. 2 schematically illustrating the vehicle engine control system of this invention.

FIG. 3 is a view similar to FIG. 2 and illustrates the differential vacuum regulator in another operating condition thereof.

FIG. 4 is a fragmentary cross-sectional view taken on line 4—4 of FIG. 2.

FIG. 5 is a view similar to FIG. 2 and illustrates the differential vacuum regulator in another operating condition thereof.

FIG. 6 is a view similar to FIG. 5 and illustrates the differential vacuum regulator in another operating condition thereof.

While the various features of this invention are hereinafter described and illustrated as being particularly adapted to provide a device for controlling spark timing of an automobile engine, it is to be understood that the various features of this invention can be utilized singly or in any combination thereof to provide a device for other systems as desired.

Therefore, this invention is not to be limited to only the embodiment illustrated in the drawings, because the drawings are utilized to illustrate one of the wide variety of uses of this invention.

Referring now to FIGS. 1 and 2, the improved differential vacuum regulator of this invention is generally indicated by the reference numeral 10 and is illustrated in FIG. 2 as being schematically interconnected in an automobile engine control system of this invention that is generally indicated by the reference numeral 11 and comprises an engine manifold vacuum source 12 and a distributor vacuum operated actuator 13 for controlling the spark timing of the engine control system 11 in a manner well known in the art.

The differential vacuum regulator 10 comprises a housing means 14 having an inlet 15 adapted to be interconnected to the manifold vacuum source 12 by a conduit means 16 and an outlet 17 adapted to be interconnected to the vacuum operated actuator 13 by a conduit means 18. The housing means 14 carries a flexible diaphragm 19 that separates the inlet 15 from the outlet 17 and cooperates with the housing means 14 to define an inlet chamber 20 on the side 21 of the diaphragm 19 and an outlet chamber 22 on the side 23 of the diaphragm 19, the inlet chamber 20 being interconnected to the inlet 15 and the outlet chamber 22 being interconnected to the outlet 17.

The flexible diaphragm 19 has an opening means 24 passing centrally therethrough and being adapted to interconnect the inlet chamber 20 and the outlet chamber 22 together as illustrated in FIGS. 2 and 6 for a purpose hereinafter described.

A movable valve member 25 is carried by the housing means 14 and has a disc-like surface 26 for engaging against the side 23 of the diaphragm 19 in the manner illustrated in FIGS. 3 and 5 to close the opening means 24 of the diaphragm 19 from the outlet chamber 22 and interconnect the same to a passage 27 that passes through a stem 28 of the valve member 25, the valve stem 28 being disposed for axial movement in a valve seat means 29 of the housing means 14 that leads from the outlet chamber 22 to a vent or atmosphere chamber 30 formed in the housing means 14 and containing suitable filter material 31. Another valve member 32 is disposed in the chamber 30 and is adapted to open and close the valve seat means 29, the valve member 32 being operatively associated with the valve member 25 so that the central portion thereof is engageable by the left hand end of the stem 28 of the valve member 25 to close the left-hand end of the passage 27 thereof.

In this manner, when a vacuum is produced in the outlet chamber 22 of the housing means 14 in a manner hereinafter described and the diaphragm 19 is disposed away from the valve member 25 in the manner illustrated in FIG. 2, the vacuum in the chamber 22 is also in the passage 27 of the valve stem 28 and holds the valve member 32 against the left hand end of the stem 28 by the resulting pressure differential across the valve member 32, the valve member 32 also being seated against the valve seat 29 by the resulting pressure differential created across the valve member 32 between the chambers 30 and 22. However, when the diaphragm 19 is moved to the left in the manner illustrated in FIG. 3 by a resulting pressure differential being created across the diaphragm 19 in a manner hereinafter described, the stem 27 pushes the valve member 32 away from the valve seat means 29 to interconnect the atmosphere chamber 30 to the outlet chamber 22 through the open valve seat 29 and the space between the valve seat 29 and valve stem 28, the valve member 32 remaining on the left hand end of the valve stem 27 because of the pressure differential acting across the valve member 32 because the passage 27 of the valve stem 28 is still in communication with the vacuum in the chamber 20 through the opening means 24 of the diaphragm 19. Such leftward movement of the valve member 26 terminates when the valve member 26 engages against embossments or ribs 33, FIGS. 2 and 4, formed on the housing means 14 to permit the opened valve seat 29 to communicate with the outlet chamber 22 when the valve member 26 has been moved against the ribs 33 in the manner illustrated in FIG. 3.

Subsequently, when the pressure differential across the diaphragm 19 substantially decreases to zero so that the diaphragm 19 can return to the position illustrated in FIG. 2 by its natural bias, the valve member 26 follows such rightward movement until the valve member 32 seats against the valve seat 29 in the manner illustrated in FIG. 2 whereby the diaphragm 19 can move away from the valve member 26 in the manner illustrated in FIG. 2 to interconnect the chambers 22 and 20 through the opening means 24 thereof for a purpose hereinafter described.

A temperature responsive device that is generally indicated by the reference numeral 34 is carried by the housing means 14 and comprises a cylinder section 35 having a movable piston 36 extending out of the cylinder section 35 and being moved to the left in the drawings by a suitable wax-like charge in the cylinder 35 when the device 34 senses a certain temperature, such as 220° F. as will be apparent hereinafter, in a manner well known in the art, the piston 36 contracting into the cylinder 35 when the device 34 senses a temperature below the certain temperature thereof.

A stem member 37 has an end 38 thereof adapted to bear against an end 39 of the cylinder 35 by the force of a compression spring 40 having one end 41 bearing against an annular flange 42 of the stem 37 and the other end 43 thereof bearing against a shoulder 44 of the housing means 14, the end 38 of the stem 37 having an opening 45 therein receiving the piston 36.

The left-hand end 46 of the stem member 37 passes through an opening 47 of a spring retainer 48 and is operatively interconnected thereto by outwardly directed tangs 49 as illustrated. A compression spring 50 is disposed in the inlet chamber 20 and has one end 51 bearing against the housing means 14 and the other end 52 thereof bearing against the spring retainer 48 whereby the force of the spring 50 tends to move the spring retainer 48 toward the side 21 of the diaphragm 19.

However, as long as the temperature responsive device 34 is sensing a temperature below the certain temperature, which in the example of the engine control system 11 is 220° F., the force of the spring 40 is adapted to maintain the spring retainer 48 sufficiently to the right in opposition to the force of the compression spring 50 so that the spring retainer 48 does not engage the diaphragm 19 as illustrated in FIGS. 2 and 3. However, when the temperature responsive device 34 is sensing the certain temperature or above, the piston 36 thereof has extended outwardly to the left to carry the stem member 37 therewith in opposition to the force of the compression spring 40 to collapse the compression spring 40 and permit the compression spring 50 to move the spring retainer 48 against the diaphragm 19 in the manner illustrated in FIGS. 5 and 6 to add the force of the spring 50 to the diaphragm 19 for a purpose hereinafter described.

When the temperature being sensed by the device 34 falls below the certain temperature, the piston 36 collapses into the cylinder 35 and the compression spring 40 moves the stem member 37 to the right and thereby collapses the compression spring 50 and moves, the spring retainer 48 out of engagement with the diaphragm 19 as illustrated in FIGS. 2 and 3 whereby the force of the spring 50 is no longer active on the diaphragm 19.

From the above, it can be seen that the differential vacuum regulator 10 of this invention can be formed in a simple and economical manner to operate the engine control system 11 of this invention in a manner now to be described.

With the inlet 15 and outlet 17 of the differential vacuum regulator 10 being respectively interconnected to the engine vacuum manifold 12 and the vacuum operated actuator 13, the spring retainer 48 is maintained to the right in the drawings by the temperature responsive device 34 as long as the engine coolant temperature is below 220° F. Thus, the vacuum being created in the outlet chamber 22 is substantially the same as the vacuum being created in the inlet chamber 20 because the chambers 20 and 22 are interconnected together by the opening 24 in the diaphragm 19 whereby the vacuum operated actuator 13 will be operated at one level of operation thereof. Should the vacuum in the chamber 22 be greater than the vacuum in the inlet chamber 20, the resulting pressure differential across the diaphragm 19 will cause the diaphragm 19 to move to the left as illustrated in FIG. 3 and engage against the valve member 26 to disconnect the opening 24 of the diaphragm 19 from the outlet chamber 22 and cause the valve member 32 to open the valve seat 29 and thereby permit atmosphere to seep into the chamber 22 through the open valve seat 29 until the vacuum levels in the chambers 20 and 22 equalize. When the vacuum levels in the chambers 20 and 22 equalize, the diaphragm 19 will return to the position illustrated in FIG. 2 whereby the valve member 32 closes against the valve seat 29 as previously described.

When the engine coolant temperature reaches 220° F. or above, the temperature responsive device 34 has extended the piston 36 to the left in the manner illustrated in FIGS. 5 and 6 so that the compression spring 40 is collapsed sufficiently to permit the compression spring 50 to move the spring retainer 48 against the side 21 of the diaphragm 19 and add the force of the spring 50 to the diaphragm 19 tending to move the diaphragm 19 to the left.

In this manner, it requires a lesser vacuum value in the outlet chamber 22 than the vacuum value in the inlet chamber 20 to maintain the diaphragm 19 in the neutral position illustrated in FIG. 6 whereby the vacuum value level being directed to the vacuum operated actuator 13 is at a different level than when the spring 50 is rendered inactive or removed from acting on the diaphragm 19 in the manner illustrated in FIGS. 2 and 3.

In particular, in the example of the engine system 11 of this invention, when the force of the spring 50 is added to the right side 21 of the diaphragm 19 in the manner illustrated in FIGS. 5 and 6, the vacuum level in the chamber 22 is now the same as the manifold vacuum chamber 20 minus 1.5 inches Hg so that the actuator 13 causes a shift in the spark timing of the engine to prevent overheating thereof.

With the force of the spring 50 being added to the diaphragm 19 in the manner illustrated in FIGS. 5 and 6, should the vacuum value in the chamber 22 be greater than the manifold vacuum minus 1.5 inches Hg previously described, the resulting pressure differential across the diaphragm 19 causes the diaphragm 19 to move to the left to open the valve member 32 and thereby permit the atmosphere to bleed into the chamber 22 to return the diaphragm 19 to the balanced condition illustrated in FIG. 6 wherein the vacuum value in the outlet chamber 22 is the same as the vacuum value in the inlet chamber 20 minus 1.5 inches Hg.

Therefore, it can be seen that by adding the force of the spring 50 to the diaphragm 19, the spring 50 will create a condition whereby the only way that relay balance can be achieved is for the absolute pressure on the output side of the diaphragm to be higher (less vacuum) than on the input side. By properly matching the diaphragm area and the bias spring load 50, the proper differential can be achieved. However, by removing the bias spring 50 in the manner illustrated in FIGS. 2 and 3, the vacuum differential is removed so that substantially the same vacuum will exist on both the input and output sides of the diaphragm 19. Accordingly, the differential vacuum regulator of this invention is so designed that the bias spring 50 is "picked up" off of the diaphragm 19 at temperatures below 220° F. and allowed to rest on the diaphragm 19 at temperatures above 220° F. The design is such that once 220° F. is reached and the spring load 50 is applied to the diaphragm 19, higher temperatures do not increase the bias load 50 because the stem member 37 can be further moved to the left as illustrated in FIG. 5 relative to the spring retainer 28. Accordingly, no further reduction in the output vacuum beyond the desired 1.5 inches Hg will take place.

Thus, it can be seen that this invention not only provides an improved vehicle engine control system, but also this invention provides an improved differential vacuum regulator therefor or the like.

While the form of the invention now preferred has been illustrated and described as required by the Patent Statute, it is to be understood that other forms can be utilized and still fall within the scope of the appended claims.

What is claimed is:

1. In a vehicle engine system having a vacuum manifold and a vacuum operated spark timing distributor, the improvement comprising a differential vacuum regulator having a housing means provided with an inlet interconnected to said vacuum manifold and an outlet interconnected to said distributor, and valve means carried by said housing means for interconnecting said inlet and said outlet together to produce a certain vacuum level at said outlet when said regulator is sensing an engine coolant temperature below a certain temperature whereby said distributor is operated at one level of operation thereof and for interconnecting said inlet and said outlet together to produce a different vacuum level at said outlet when said regulator is sensing said certain temperature whereby said distributor is operated at another level of operation thereof, said valve means comprising a temperature sensing device and a flexible diaphragm that is responsive to the vacuum at said inlet, said diaphragm having an inlet side that is exposed to said inlet and having an outlet side that is exposed to said outlet, said valve means comprising a biasing means for acting on said inlet side of said flexible diaphragm and being controlled by said temperature sensing device, said temperature sensing device rendering said biasing means inactive by holding said biasing means away from said inlet side of said diaphragm when said temperature sensing device is sensing a temperature below said certain temperature and rendering said biasing means active by causing said biasing means to engage and act on said inlet side of said diaphragm when said temperature sensing device is sensing said certain temperature, said flexible diaphragm separating said inlet from said outlet and having opening means therethrough for interconnecting said inlet to said outlet, said valve means comprising a valve member for opening and closing said opening means, said housing means having a valve seat leading from said outlet to the atmosphere, another valve member for opening and closing said valve seat, the first-named valve member being operatively associated with said other valve member to open said other valve member when said first-named valve member has closed said opening means of said diaphragm and to close said other valve member when said first named valve member has opened said opening means of said diaphragm.

2. A vehicle engine system as set forth in claim 1 wherein said temperature sensing device comprises a piston and cylinder device, the piston of said device being operatively interconnected to said biasing means to control said biasing means.

3. A vehicle engine system as set forth in claim 1 wherein said valve means tends to produce substantially the same vacuum level in said outlet that is produced at said inlet when said regulator is sensing a temperature below said certain temperature.

4. A vehicle engine system as set forth in claim 3 wherein said valve means tends to produce a lesser vacuum level in said outlet than is produced in said inlet when said regulator is sensing said certain temperature.

5. A vehicle engine system as set forth in claim 1 wherein said valve means tends to produce said different vacuum level in substantially a constant manner regardless of the sensed temperature above said certain temperature.

* * * * *